United States Patent
Sun

(10) Patent No.: US 10,776,047 B2
(45) Date of Patent: Sep. 15, 2020

(54) MEMORY CHARACTERISTIC BASED ACCESS COMMANDS

(71) Applicant: Micron Technology, Inc., Boise, ID (US)

(72) Inventor: Honglin Sun, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 139 days.

(21) Appl. No.: 16/117,503

(22) Filed: Aug. 30, 2018

(65) Prior Publication Data

US 2020/0073588 A1 Mar. 5, 2020

(51) Int. Cl.
  *G06F 12/02* (2006.01)
  *G06F 3/06* (2006.01)
(52) U.S. Cl.
  CPC .......... *G06F 3/0659* (2013.01); *G06F 3/0604* (2013.01); *G06F 3/0673* (2013.01)
(58) Field of Classification Search
  CPC ................................ G06F 3/0659; G06F 12/02
  USPC ........................................................ 711/154
  See application file for complete search history.

(56) References Cited

U.S. PATENT DOCUMENTS

| | | | |
|---|---|---|---|
| 6,480,982 B1 | 11/2002 | Chan et al. | |
| 2003/0126354 A1 | 7/2003 | Kahn et al. | |
| 2011/0188283 A1 | 8/2011 | Chevallier et al. | |
| 2011/0188284 A1 | 8/2011 | Chevallier et al. | |
| 2012/0311228 A1* | 12/2012 | Hsu .................... | G06F 12/0246 711/102 |
| 2019/0220397 A1* | 7/2019 | Lee ...................... | G11C 29/52 |

\* cited by examiner

*Primary Examiner* — Jae U Yu
(74) *Attorney, Agent, or Firm* — Brooks, Cameron & Huebsch, PLLC

(57) ABSTRACT

Apparatuses and methods related to generating memory characteristic based access commands generating the access commands can include providing a first access command to a memory system of a plurality of memory systems, receiving, at a host coupled to the memory system, data corresponding to characteristics of a memory device of the memory system from a controller of the memory system, where the characteristics are based at least in part on processing of the first access command. Generating access commands can also include generating, at the host, a second access command based on the data and transmitting the second access command to at least the memory system.

28 Claims, 2 Drawing Sheets

MEMORY CHARACTERISTIC BASED ACCESS COMMANDS

TECHNICAL FIELD

The present disclosure relates generally to memory, and more particularly, to apparatuses and methods associated with generating access commands based on the characteristics of memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instruction (e.g., a program, applications, etc.). The life of the memory may be limited such that, over time, the memory may fail.

DETAILED DESCRIPTION

Figure 1:
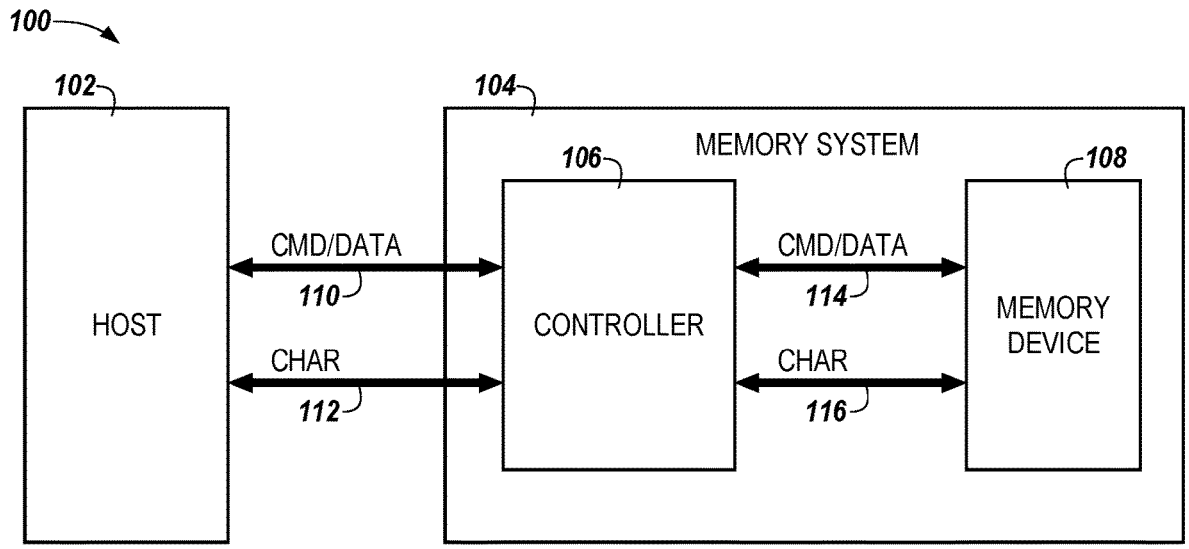
FIG. 1 is a block diagram of an apparatus in the form of a computing system including a memory system and capable of generating access commands in accordance with a number of embodiments of the present disclosure.

The present disclosure includes apparatuses and methods related to generating access commands based on characteristics of memory. Access commands may be configured based on characteristics of a memory. For example, an access command can be configured in view of a read voltage and/or a write voltage used for a memory device. However, the characteristics used to configure access commands may be determined at a time prior to the generation of the access command such that the characteristics used to configure the access commands are not the characteristics of the memory device at the time the access commands are generated.

For example, a read voltage or a write voltage of a memory device, a block of the memory device, and/or a cell of the memory device can drift over time. Voltage drift can result in different read voltages and/or write voltages over time. Access commands may have different effects over time if the access commands are not configured accordingly.

In some examples, the access commands can be configured to prolong the health of the memory device. Over time, a memory device may fail due to hardware failures. Said differently, memory devices can have limited lifespans. The lifespan of a memory device may be attributed to the use of the memory device and/or characteristics of the memory device while the device is in use. For example, the quantity of access commands processed by a memory device, block of a memory device, and/or cell of a memory device can contribute to hardware failure. The higher the quantity of access commands the more likely a memory device is to fail. Similarly, a temperature at which a memory device processes access commands can contribute to the degradation of the memory device, blocks of the memory device, and/or memory cells of the memory device. Such that the life of a memory device may be prolonged by processing access commands in a memory device at a first temperature over processing access commands in a memory device at a second temperature.

In some examples, access commands can be configured to optimize the execution of access commands in memory devices. For example, a quantity of access commands which are executed by a memory device may correlate to an error rate of the access commands. The error rate of executing access commands may increase as the quantity of access commands executed by a memory device increases over time.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory system 104 and capable of generating access commands in accordance with a number of embodiments of the present disclosure. The computing system 100 includes a host 102, the memory system 104, a controller 106, a memory device 108, interfaces 110 and 114, and interfaces 112 and 116.

The computing system 100 includes the host 102 coupled to the controller 106 (e.g., via interfaces 110 and 112), which is part of the memory system 104. The computing system 100 can be a laptop computer, personal computers, digital camera, digital recording and playback device, mobile telephone, PDA, memory card reader, interface hub, sensor, Internet-of-Things (IoT) enabled device, among other systems, and the host 102 can include a number of processing resources (e.g., one or more processors) capable of accessing the memory system 104 (e.g., via controller 106). The host 102 may be responsible for execution of an operating system (OS) and/or various applications that can be loaded thereto (e.g., from the memory system 104 via the controller 106).

The controller 106 may receive memory access commands (e.g., in the form of read and write commands, which may be referred to as load and store commands, respectively) from the host 102. The controller 106 can transfer commands and/or data between the host 102 and the memory system 104 over the interfaces 110, 112, 114, and 116 which can comprise physical interfaces such as buses, for example, employing a suitable protocol. Such protocol may be custom or proprietary, or one or more of the interfaces 110, 112, 114, and 116 may employ a standardized protocol, such as Peripheral Component Interconnect Express (PCIe), Gen-Z, CCIX, or the like.

As an example, the interfaces 110 and 114 may comprise combined address, command, and data buses or separate buses for respective address, command, and data signals. The controller 106 can comprise control circuitry, in the form of hardware, firmware, or software, or any combination of the three. As an example, the controller 106 can comprise a state machine, a sequencer, and/or some other type of control circuitry, which may be implemented in the form of an application specific integrated circuit (ASIC) coupled to a printed circuit board. In a number of embodiments, the controller 106 may be co-located with the memory system 104 as shown in FIG. 1 (in a system-on-chip (SOC) configuration). The controller 106 can, for example, generate and configure access commands received from the host 102 in view of characteristics of the memory system 104.

In FIG. 1, the memory system 104 includes a number of memory devices including memory device 108. The memory system 104 can comprise a number of physical memory "chips," or dice which can each include a number of arrays (e.g., banks) of memory cells and corresponding support circuitry (e.g., address circuitry, I/O circuitry, control circuitry, read/write circuitry, etc.) associated with accessing the array(s) (e.g., to read data from the arrays and write data to the arrays). As an example, the memory device 108 and the memory device 208-1 to 208-N in FIG. 2 can include a number of DRAM devices, SRAM devices, PCRAM devices, RRAM devices, FeRAM, phase-change memory, 3DXPoint, and/or Flash memory devices. In a number of embodiments, the memory system 104 can serve as main memory for the computing system.

The memory system 104 and/or the memory device 108 can have characteristics that define a function of the memory system 104 and/or the memory device 108. The characteristics of the memory system 104 and/or the memory device 108 can include a quantity of read commands, a quantity of write commands, a quantity of block write commands, and/or a quantity of false write commands processed at the memory system 104 and/or the memory device 108. The characteristics of the memory system 104 and/or the memory device 108 can also include a temperature of the memory system 104 and/or the memory device 108. The temperature information can be point temperature data and/or statistical temperature data. As used herein point data includes a single data value whereas statistical data comprises use of two or more values to generate a statistical value. The characteristics of the memory system 104 can further include voltage values, resistance values, and/or current values. The characteristics of the memory system 104 and/or the memory device 108 can include other types of data not described herein.

The characteristics of the memory system 104 and/or the memory device 108 can be at the system level, device level, block level, and/or cell level. For example, a characteristic can include the temperature of the memory system 104, the temperature of the memory device 108, a temperature of a block of the memory device 108, and/or a temperature of a memory cell of the block. A characteristic of the memory device 108 can also include a voltage of a memory cell observed (e.g., measured) at a corresponding sense amplifier among other examples of characteristics. As used herein, a characteristic of the memory system 104 also includes a characteristic of the memory device 108, a characteristic of a block of the memory device 108, and/or a characteristic of a memory cell of the memory device 108. References to characteristics of the memory system 104 further includes references to characteristics of the memory device 108, characteristics of a block of the memory device 108, and/or characteristics of a memory cell of the memory device 108.

The characteristics of the memory system 104 can be provided to the controller 106 via the interface 116. The characteristics of the memory system 104 can further be provided from the controller 106 to the host via the interface 112. In some examples, the interfaces 112 and/or 116 can be considered a sideband channel. The interfaces 112 and/or 116 can be physical interfaces and/or electrical interfaces. The interfaces 112 and 116 are independent of the interfaces 110 and 114. The interfaces 112 and 116 may comprise electronic connections that are separate from the electronic connections comprising the interfaces 110 and 114. The interfaces 112 and 116 may employ a same protocol as the interfaces 110 and/or 114 or may employ a different protocol as the interfaces 110 and/or 114.

The characteristics can be provided as data. The data describing the characteristics can be unencoded data or encoded data. Unencoded data provides unaltered data provided by a source of the unaltered data such as by a sensor generating the data. Encoded data provides data that is altered after being provided by sensors. In some examples, the encoded data can reduce the size of data as compared to unencoded data. For instance, temperature data can be provided using three or more bits while encoded data can be provided using one bit, among other examples. Encoding can comprise dividing the data into buckets using thresholds and assigning each bucket a bit-value. Temperatures above a threshold temperature can be encoded with a "0"-bit value while temperatures equal to or below the threshold temperature can be encoded with "1"-bit value. Encoded data can comprise more than one bit.

The data describing the characteristics can be provided via events. An event is a message generated responsive to the generation of data. For example, an event can be a message generated responsive to generating a temperature reading and/or a voltage reading. In some examples, the event can be generated responsive to processing an access command or generating an access command. The event can be asynchronous. For example, the event can be generated and/or processed without having a request for the event. The event can be generated without having a pending request for the event from the host 102 and/or the controller 106. The event can be processed at the controller 106 and/or the host 102.

In a number of instances, an event can include data associated with multiple characteristics of the memory system 104. The event can include data associated with a first characteristic of a memory cell of the memory device 108 and/or a second characteristic of the memory device 108.

The characteristics of the memory system 104 and/or the memory device 108 can be measured responsive to the processing of access commands, at random, and/or at given intervals of time. For example, the data associated with a characteristic of the event may be generated responsive to receiving an access command via interface 110 and/or 114. The data associated with characteristics of the memory system 104 may be generated responsive to executing an access command. For instance, the data associated with characteristics of the memory system 104 may be generated after the access command is received but before the access command is executed. The data associated with characteristics of the memory system 104 may be generated while the access command is executed. The data associated with the characteristics of the memory system 104 can be generated after the access command is executed.

Similarly, the events including the data associated with the characteristics of the memory system 104 may be generated and/or processed responsive to receiving the access commands, processing the access commands, generating the data associated with the characteristics of the memory system 104, and/or accumulating the data associated with the characteristics of the memory system 104. For example, an event can be generated and/or processed responsive to receiving an access command and/or responsive to generating data describing a characteristic of the memory system 104. The event can be generated and/or processed while the access command is being executed. The event can be generated and/or processed after the access command has been executed. In some examples, multiple instances of data describing characteristics of the memory system 104 can be generated before the event is generated. In such examples, a buffer can be provided at, for example, a local event logic 222 and/or global event logic 220 of FIG. 2. Multiple instances of data can be accumulated at a buffer and may be retrieved upon the creation of an event.

Upon accessing the data describing a characteristic of the memory system 104, the host 102, the controller 106, and/or any other device configured to generate access commands can utilize the data to generate future access commands. For example, the host 102 and/or the controller 106 can utilize data describing characteristics to generate a write access command and/or a read access command. For instance, responsive to receiving a sensed read voltage of a memory cell and responsive to failing to decode a read access command from which the sensed read voltage was measured, the host 102 may reissue the read access command configured to utilize a read voltage that is greater and/or lower than the sensed read voltage.

In some instances, the host 102 may issue an access command without configuring the access command utilizing data describing characteristics of the memory system 104. The controller 106 may receive the access command and may process the access command utilizing the data describing the characteristics of the memory system 104. For example, the controller 106 can utilize a sensed read voltage to configure a sense amplifier amplifying the voltage of a memory cell accessed in view of processing the access command.

Figure 2:
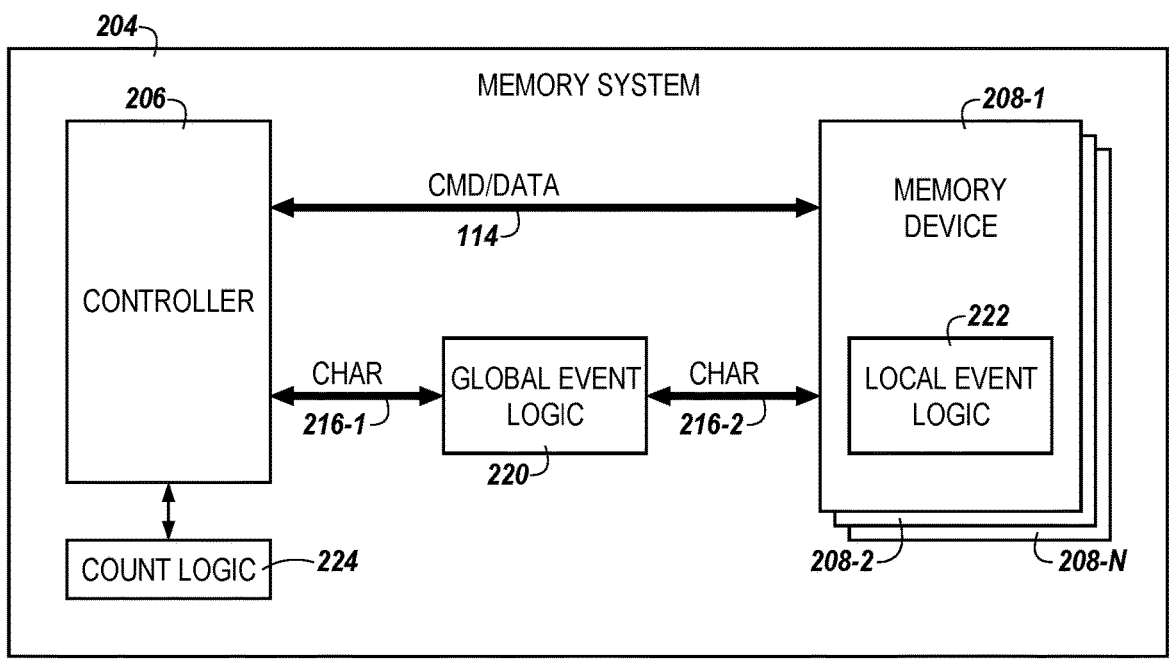
FIG. 2 is a block diagram of an apparatus in the form of a memory system including a controller capable of providing data corresponding to characteristics of a memory device in accordance with a number of embodiments of the present disclosure.

FIG. 2 is a block diagram of an apparatus in the form of a memory system 204 including a controller 206 capable of providing data corresponding to characteristics of a memory device in accordance with a number of embodiments of the present disclosure. The memory system 204 includes the controller 206, memory devices 208-1, 208-2, . . . , 208-N, global event logic 220, and local event logic 222. The memory system 204 also includes interface 214 and interfaces 216-1 and 216-2. The memory system 204 further includes counts logic 224.

The memory system 204 can comprise multiple channels each having a number of memory devices 208-1 to 208-N corresponding thereto. The memory devices 208-1 to 208-N can collectively be referred to as memory devices 208. The memory devices 208 can be, for example, a "chip" comprising multiple banks. The controller 206 can service multiple memory channels or the controller 206 can be implemented as multiple separate controllers (e.g., one for each channel). For example, the memory system 204 can comprise a plurality of modules (e.g., dual in-line memory modules (DIMMs)).

The local event logic 222 and the global event logic 220 can be referred to collectively as event logic. Each of the memory devices 208 can comprise a different local event logic 222. For example, the memory device 208-1 can include the local event logic 222 (e.g., a first local event logic), the memory device 208-2 can include a second local event logic, . . . , while the memory device 208-N can include an Nth local event logic. The local event logics can be coupled to the global event logic 220 via interface 216-2. In some examples, the global event logic 220 is coupled to each of the local event logics via a different interface from a plurality of interfaces including interface 116-2.

A first local event logic (e.g., local event logic 222) local to the memory device 208-1, a second local event logic local to the memory device 208-2, . . . , and an Nth local event logic local to the memory device 208-N can be coupled to the global event logic 220 via the interface 116-2. In other examples, the first local event logic can be coupled to the global event logic via a first interface, the second local event logic can be coupled to the global event logic via a second interface, . . . , and the Nth local event logic can be coupled to the global event logic via an Nth interface, where the first interface, the second interface, . . . , and the Nth interface are physically and/or logically independent from each other.

The event logic (e.g., local event logic 222 and global event logic 220) can process (e.g., handle) events generated by one or more sensors. In some examples, the event logic can generate the events from data generated by one or more sensors and/or from data accessed by the event logic.

For instance, the local event logic 222 can generate events from data describing characteristics of the memory device 208-1, a bank of the memory device 208-1, and/or cells of the bank of the memory device 208-1. The local event logic 222 can access the data. For example, the local event logic 222 can access a read voltage from a sense amplifier and generate an event comprising the read voltage. The local event logic 222 can also receive temperature data from a sensor such as a temperature sensor of a block of the memory device 208-1. The local event logic 222 can generate an event from temperature data.

The local event logics corresponding to each of the memory devices 208 and the global event logics can comprise a hierarchy of event logics configured to process the events. For example, the local event logics including the local event logic 222 can generate events and provide the events to the global event logic 220. In some instances, the local event logics do not provide events to each other as they may not be coupled to each other and/or they are at the same level of a hierarchy. The global event logic can generate events and/or provide events to the controller 206. In some instances, the controller 206 provides events to the host 102 in FIG. 1.

In some examples, the global event logic 220 can collect, aggregate, generate, and process some of events and provide correct information to the host 102 and/or the controller 206. For example, the global event logic 220 can access data from which the events are generated. The data can be received from sensors and/or accessed. For example, the data can be received from a temperature sensor that measures the temperature of the memory system 204. The data can be accessed from, for example, hardware devices including the memory devices 208 and/or the interfaces 214, 216-1, and/or 216-2.

To collect events, the global event logic 220 can receive multiple events before providing the events to the controller 206 and/or the host. To aggregate events, the global event logic 220 can receive multiple events and can generate a single event from the multiple events. The global event logic 220 can then provide the single event to the controller 206 and/or the host. The global event logic 220 can also add data describing a characteristic of the memory system 204 to an event generated by the local event logic 222. To process events, the global event logic 220 can provide events received from the local event logic 222 or generated by the global event logic 220 to the controller 206 and/or the host. In some examples, the global event logic 220 can generate new events without receiving events from the local event logic 222.

Upon receiving the events via interfaces 216-1, the controller 206 may utilize the events to configure access commands. The controller 206 may be configured to store the events in the count logic 224. The controller 206 may also be configured to modify data stored in the count logic 224 with the data provided via the events. The count logic 224 can be internal to the controller 206 and/or external to the controller 224. The count logic 224 is shown external to the controller 206. In instances where the count logic 224 is both internal and external to the controller 206, the count logic 224 can be configured to store certain types of data internally in the controller 206 and different types of data externally in the controller 206. The controller 206 can delete and/or modify the data stored in the count logic 224. For example, the controller 206 can delete and/or modify the data stored in the count logic 224 after the data is accessed. The controller 206 can delete and/or modify the data at intervals of time. The controller 206 can delete and/or modify the data at random.

The count logic 224 can store data provided via one or more events or multiple instances of data provided via an event. For example, the count logic can comprise memory, such as registers, which may store data. For instance, a first number of the registers can store a first type of data and a second number of the registers can store a second type of data, although more or fewer types of data can be stored in the registers comprising the count logic 224. The data can be stored as specific instances of data, or multiple instances of data can be stored in a same number of registers. For example, a first temperature and a second temperature can be stored in a first register and a second register, respectively or a representation of the first temperature and the second temperature can be stored in the first registers.

Multiple instance of data can be stored together by combining the values of the instances of data. For example, a medium or an average of a plurality of instances of temperature data can be calculated by the controller 206. The controller 206 can then store the calculated values combining multiple instances of data in one or more registers of the count logic 224.

The data provided via events can be stored as encoded or unencoded data. For example, the data describing characteristics of the memory system 204 can be stored in the count logic 224 as encoded or unencoded data. The multiple instances of the data can be stored as encoded or unencoded data. For example, multiple instances of encoded data can be processed by the controller 206 to generate a single encoded instance of the data which can be stored in the count logic 224.

The data can be retrieved from the controller 206 to generate and/or configure an access command provided by a host. In some instances, the data can be utilized without storing or retrieving the data from the count logic 224. The data gathered responsive to processing a prior access command can be utilized to generate and/or configure an access command and/or a command corresponding to or associated with the access command. For example, the access command may be performed by the memory device 208-1 as an access operation (e.g., write operation, read operation, and/or logical operation). The controller 206 can configure an access operation performed in view of data describing characteristics of the memory system 204 where the access operation is performed in response to the access command. The controller 206 can also perform commands and/or operations unassociated with an access command utilizing data describing characteristics of the memory system 204. For example, the controller 206 can generate a refresh rate of memory cells in the memory devices 208 in view of data describing the characteristics of the memory system 204.

In some embodiments, the controller 206 can cause the generation of data describing characteristics of the memory system 204 by providing signals to one or more sensors, responsive to receiving an access command. The controller 206 may delay processing of the access command. The one or more sensors can provide data describing the characteristics of the memory system 204 to the local event logic 222. The local event logic 222 can generate and provide an event to the global event logic 220. The global event logic 220 can provide the event to the controller 206. The controller 206 can extract the data from the event and can utilized the data to modify the delayed access command. The controller 206 can provide the access command to the memory device 208-1 via the interface 216-2.

In some instances, the host and/or the controller 206 can modify and/or generate an access command by selecting a timing in which the access command is provided to the memory system 204. For example, to prolong the life of the memory system 204, the host can delay providing access commands to the memory system 204. The host can delay providing access commands until a predetermined amount of time has passed from the last issuance of an access command. The host can delay providing access commands by refraining from issuing a quantity of access commands in a duration of time. The data describing the characteristics of the memory system 204, can portray, for example, a quantity of access commands processed in the duration of time and/or a time associated with the processing of the latest access command by the memory system 204, and/or the memory devices 208.

The host and/or the controller 206 can also determine a distribution of the access commands based on the data describing the characteristics of the memory system 204. For example, the host can select a memory system 204 for issuance of a write command based on a usage pattern described by the data. The host and/or the controller 204 can select a memory device from the memory devices 208 for issuance of a write command based on a usage pattern described by the data. For example, if a majority of the access commands have been provided to the memory device 208-2, then the host and/or the controller 206 can distribute the access command to a different memory device such as memory device 208-N to prolong the life of the memory device 208-N and/or the memory system 204. In some instances, the controller 206 can make the adjustments to the access command and/or the processing of the access command.

Figure 3:
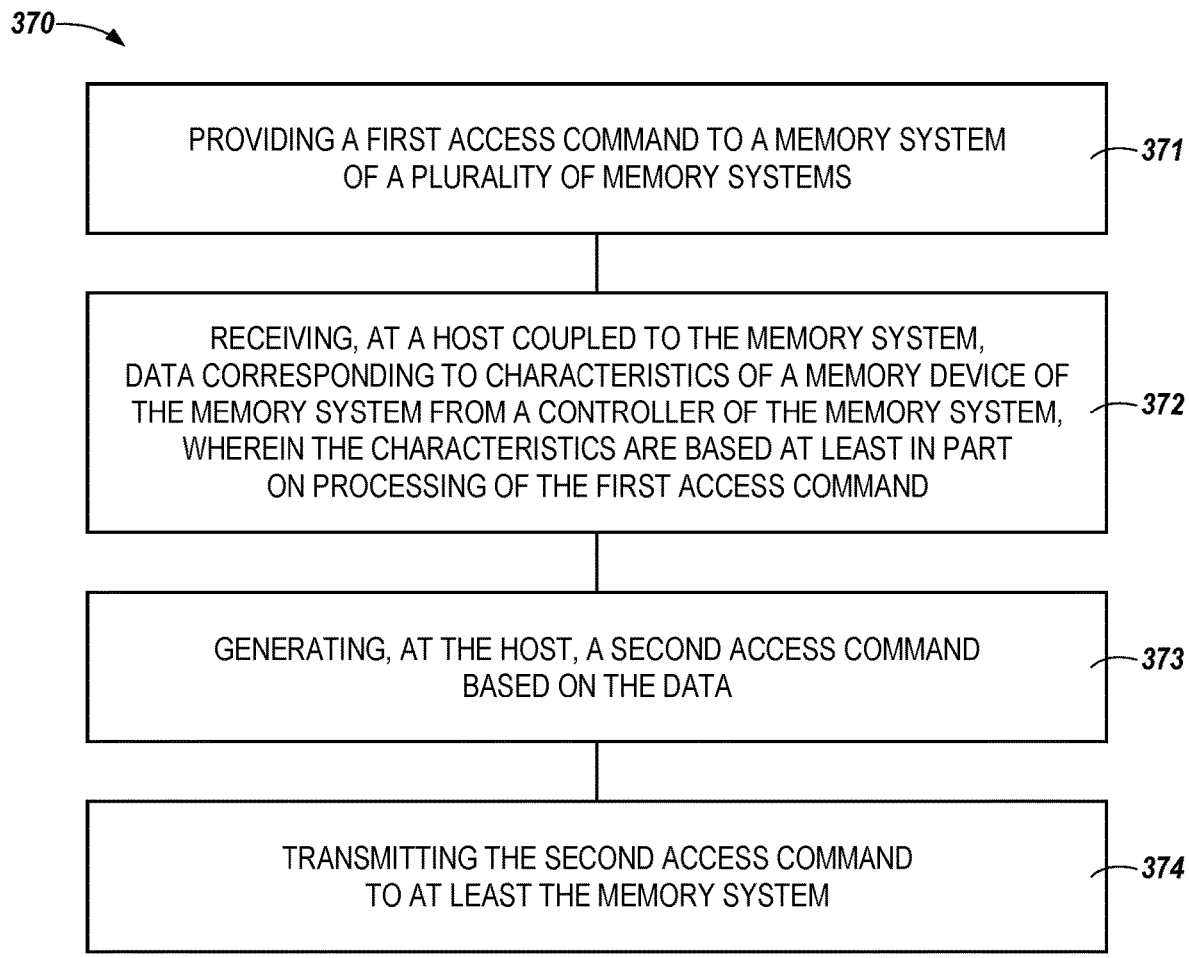
FIG. 3 illustrates an example flow diagram of a method for memory access verification in accordance with a number of embodiments of the present disclosure.

FIG. 3 illustrates an example flow diagram of a method for memory access verification in accordance with a number of embodiments of the present disclosure. The method described in flow chart 370 can be executed by a host of a computing system.

At 371, the first access command can be provided to a memory system. A host of the computing system hosting the memory system can provide the first access command. At 372, the host coupled to the memory system can receive data corresponding to the characteristics of the memory device of the memory system from a controller of the memory system, where the characteristics are expressed in view of the processing of the first access command. The characteristics can be expressed in view of the processing of the first access command if the data describing the characteristics was generated responsive to the processing of the first access command. For example, a temperature of the memory system can be measured and provided as data while the first access command is being processed by the memory system.

At 373, the host can modify a second access command based on the data. The second access command can be generated and/or processed subsequent to the generation and/or processing of the first access command. At 374, the host can provide the second access command to one of a plurality of memory systems including the memory system.

The data can be received from the memory system (e.g., the controller of the memory system) via a sideband channel. The sideband channel can couple the host to the memory system independent of one or more system buses and/or system interface transferring commands, data, and/or address information.

The host can modify the second access command by generating and/or modifying a timing in which the second access command is provided to the memory system and/or a timing in which the memory system processes the access command. The host can also modify a distribution of the access commands and/or future access commands based on the data describing the characteristics of the memory system. For example, the host can determine whether to issue the access command to the memory system or to a different memory system based on the data describing the characteristics of the memory system.

The host and/or the controller of the memory system can modify future access commands based on the data describing the characteristics of the memory system to extend the life of the memory system, a plurality of memory systems including the memory system, and/or to optimize an execution of the access command.

In some examples, the controller can generate an access command based on the data and/or can modify an access command based on the data describing the characteristics of the memory system. For example, the controller can receive an unmodified access command from the host. The controller can modify the received access command based on data describing a characteristic of the memory system. The access command that is modified may be referred to as a modified access command. The host and/or the controller can be configured to generate a modified access command. For example, the host and/or the controller may generate an access command and may modify the access command before providing the access command to a different device.

The access command can be read commands, write commands, block write commands, and/or false write commands. The events can include voltage data, temperature data, a read count, a write count, a force write count, a block write count, and/or a block read count. The event can also include resistance data and/or current data. The voltage data, the resistance data, and/or the current data can be measured responsive to performing a previous access command on the memory device. The voltage data, the resistance data, and/or the current data can be measured at a sense amplifier of the memory device. The temperature data can correspond to a temperature of a memory cell, an array, a block, a device, and/or a memory system. A read count can include a quantity of times a read operation has been performed on a memory cell, an array of memory cells, a block, a memory device, and/or a memory system. A read count stored in count circuitry can be incremented and/or decremented. A write count can include a quantity of times a read operation has been performed on a memory cell, an array of memory cells, a block, a memory device, and/or a memory system. The write count can also be incremented and/or can be decremented. The force write count, the block write count, and/or the block read count can be incremented and/or decremented.

The data describing the characteristics of the memory system can be stored for later use and/or can be used without storing the data. The stored data and/or the data that is not stored can be used to modify an access command. Recently received data can be incorporated with stored data. For example, a recently received count can be used to increment the stored counts.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   providing a first access command to a memory system of a plurality of memory systems;
   receiving, at a host coupled to the memory system, data corresponding to characteristics of a memory device of the memory system from a controller of the memory system, wherein the data is generated by a sensor while the first access command is executed;
   generating, at the host, a second access command adjusted based on the data; and
   transmitting the second access command to at least the memory system.

2. The method of claim 1, further comprising receiving the data via a sideband channel of the memory system.

3. The method of claim 2, wherein the sideband channel couples the host to the memory system independent of one or more system buses.

4. The method of claim 1, further comprising:
   selecting a timing in which the second access command is provided to the memory system.

5. The method of claim 1, further comprising:
   selecting a distribution of the second access command to the plurality of memory systems including the memory system.

6. An apparatus, comprising:
   a memory device;
   a logic configured to provide a message to a controller; and
   the controller configured to:
      receive the message from the logic, wherein the message comprises data describing a characteristic of the memory device, and wherein the data is generated by a sensor while an access command is executed;
      generate an access command adjusted based on the characteristic of the memory device; and
      perform the access command on the memory device.

7. The apparatus of claim 6, wherein the controller is further configured to generate a read command, a write command, a block write command, or a false write command.

8. The apparatus of claim 6, wherein the message comprises a voltage measured responsive to performing a previous access command on the memory device.

9. The apparatus of claim 8, wherein message comprises the voltage measured at a sense amplifier of the memory device responsive to performing a previous access command on the memory device.

10. The apparatus of claim 6, wherein the message comprises a temperature of the memory device.

11. The apparatus of claim 10, wherein the temperature corresponds to a memory cell of the memory device.

12. The apparatus of claim 10, wherein the temperature corresponds to a block of the memory device.

13. The apparatus of claim 6, wherein the message comprises a read count.

14. The apparatus of claim 6, wherein the message comprises a force write count.

15. The apparatus of claim 6, wherein the message comprises a write count.

16. The apparatus of claim 6, wherein the controller is further configured to store the data responsive to a determination that the characteristic is of a type which is stored.

17. The apparatus of claim 16, wherein the controller is further configured to generate the access command based on the stored data.

18. The apparatus of claim 16, wherein the controller is further configured to modify previously stored data with the data.

19. The apparatus of claim 18, wherein the previously stored data is of a same type as the type of the data.

20. The apparatus of claim 6, wherein the logic is internal to the memory device.

21. The apparatus of claim 6, wherein the logic is external to the memory device.

22. The apparatus of claim 6, wherein a local logic of the logic is internal to the memory device and a global logic of the logic is external to the memory device.

23. A memory system, comprising:
    a local logic internal to a memory device of the memory system and configured to:
       measure, via a sensor, characteristics of the memory device while an access command is executed;
       generate a message based on the measurements;
       provide the message to a global logic; and
    the global logic coupled to the local logic and a controller and configured to:
       receive the message from the local logic; and
       provide the message to the controller of the memory system or a host of a computing system comprising the memory system.

24. The memory device of claim 23, wherein the local logic is further configured to generate the measurements based on a receipt of an access command at the memory device.

25. The memory device of claim 23, wherein the local logic is further configured to generate the measurements based on an execution of an access command by the memory device.

26. The memory device of claim 23, wherein the local logic is further configured to generate the measurements at predefined intervals of time.

27. The memory device of claim 23, wherein the local logic is further configured to generate the measurements at random.

28. The memory device of claim 23, wherein the local logic is further configured to encode one or more of the measurements in the message.

* * * * *